US007692399B2

(12) United States Patent
Harriman et al.

(10) Patent No.: US 7,692,399 B2
(45) Date of Patent: Apr. 6, 2010

(54) DC MOTOR CONTROL (75) Inventors: Douglas L. Harriman, Portland, OR (US); Michael Teong Seng Ewe, Vancouver, WA (US); Robert D. Davis, Brush Prairie, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1659 days.

(21) Appl. No.: 10/405,774

(22) Filed: Apr. 1, 2003

(65) Prior Publication Data
US 2004/0195989 A1 Oct. 7, 2004

(51) Int. Cl.
*H02H 5/04* (2006.01)
*H02H 7/08* (2006.01)

(52) U.S. Cl. .................. 318/798; 318/783; 318/471; 361/25

(58) Field of Classification Search .......... 318/244, 318/245, 431–474, 782, 783, 789; 388/800–824; 361/23–34; 400/144–145.1
See application file for complete search history.

(56) References Cited

U.S. PATENT DOCUMENTS

| 3,955,130 | A | * | 5/1976 | Graf | 388/823 |
| 4,027,761 | A | * | 6/1977 | Quaif | 400/124.05 |
| 4,151,450 | A | * | 4/1979 | Fukuma et al. | 388/821 |
| 4,541,747 | A | * | 9/1985 | Imaizumi et al. | 400/144.2 |
| 4,563,623 | A | * | 1/1986 | Matsuka | 388/813 |
| 4,810,942 | A | * | 3/1989 | Anton | 388/809 |
| 4,849,677 | A | * | 7/1989 | Kruger | 318/473 |
| 4,884,162 | A | * | 11/1989 | Ito et al. | 361/23 |
| 4,978,239 | A | * | 12/1990 | Alexander et al. | 400/124.03 |
| 5,059,044 | A | * | 10/1991 | Takaishi | 400/120.14 |
| 5,073,861 | A | * | 12/1991 | Itoh et al. | 702/132 |
| 5,373,205 | A | * | 12/1994 | Busick et al. | 327/378 |
| 5,420,523 | A | * | 5/1995 | Walker et al. | 324/772 |
| 5,627,710 | A | * | 5/1997 | Schoeffler | 361/23 |
| 6,059,062 | A | * | 5/2000 | Staelin et al. | 180/181 |
| 6,150,777 | A | * | 11/2000 | Lander | 318/245 |
| 6,150,782 | A | * | 11/2000 | Breitling et al. | 318/434 |
| 6,601,513 | B1 | * | 8/2003 | Ozawa | 101/485 |
| 6,674,260 | B1 | * | 1/2004 | Harriman et al. | 318/599 |
| 6,700,400 | B2 | * | 3/2004 | Atarashi | 324/772 |
| 7,135,830 | B2 | * | 11/2006 | El-Ibiary | 318/561 |
| 7,248,009 | B1 | * | 7/2007 | Sundquist | 318/434 |
| 7,576,506 | B2 | * | 8/2009 | Kleinau et al. | 318/471 |
| 2006/0176005 | A1 | * | 8/2006 | Ta et al. | 318/650 |

FOREIGN PATENT DOCUMENTS

| JP | 06-153381 | * | 5/1994 |
| JP | 09-247977 | | 9/1997 |
| JP | 2002345147 | A | 11/2002 |
| JP | 2004-312992 | * | 11/2004 |

OTHER PUBLICATIONS

Co-pending, Hewlett-Packard Company U.S. Appl. No. 10/175,711, filed Jun. 20, 2002, entitled "DC Motor Control".

* cited by examiner

*Primary Examiner*—Walter Benson
*Assistant Examiner*—Eduardo Colon-Santana (57) ABSTRACT

A method of controlling a DC motor is presented. In a determining action, a thermal power dissipation is determined from a motor input and a motor velocity. In another determining action, a motor temperature is determined based on a thermal model using the thermal power dissipation. In an adjusting action, a usage of the motor is adjusted, taking the motor temperature into account.

18 Claims, 4 Drawing Sheets

DC MOTOR CONTROL

Direct current (DC) motors are able to produce torque because a current-carrying conductor located in a magnetic field experiences a force proportional to the magnitude of the flux, the current, the length of the conductor, and the sine of the angle between the conductor and the direction of the flux. When the conductor is a fixed distance (radius) from an axis about which it can rotate, a torque is produced that is proportional to the product of the force and the radius. In a DC motor, the resultant torque is the sum of the torques produced by each conductor. Each of the conductors are known as windings, and it is important for the windings to be insulated from each other so that the current flowing through them will not short circuit from one winding to another.

DC motors should be designed so that they will not overheat during usage. If the windings on a DC motor reach a temperature at which the protective coating, or insulation on the conductors melts, then the motor may short-circuit and fail. In addition to ambient conditions, things which affect the temperature of a DC motor can include the design and size of the DC motor, the voltage or current applied to the DC motor, the magnitude of the load which the DC motor is coupled to, or even changes to the efficiency of the DC motor over time. If the temperature of a DC motor cannot be measured while the DC motor is in use, then the DC motor must be designed or selected robust enough to handle the worst-case loads it can possibly see over the expected lifetime of the DC motor. Often, this means a relatively large DC motor must be selected. Using such a large DC motor may add significant cost to a product containing the DC motor.

DETAILED DESCRIPTION OF THE PREFERRED EMBODIMENTS

Figure 1:
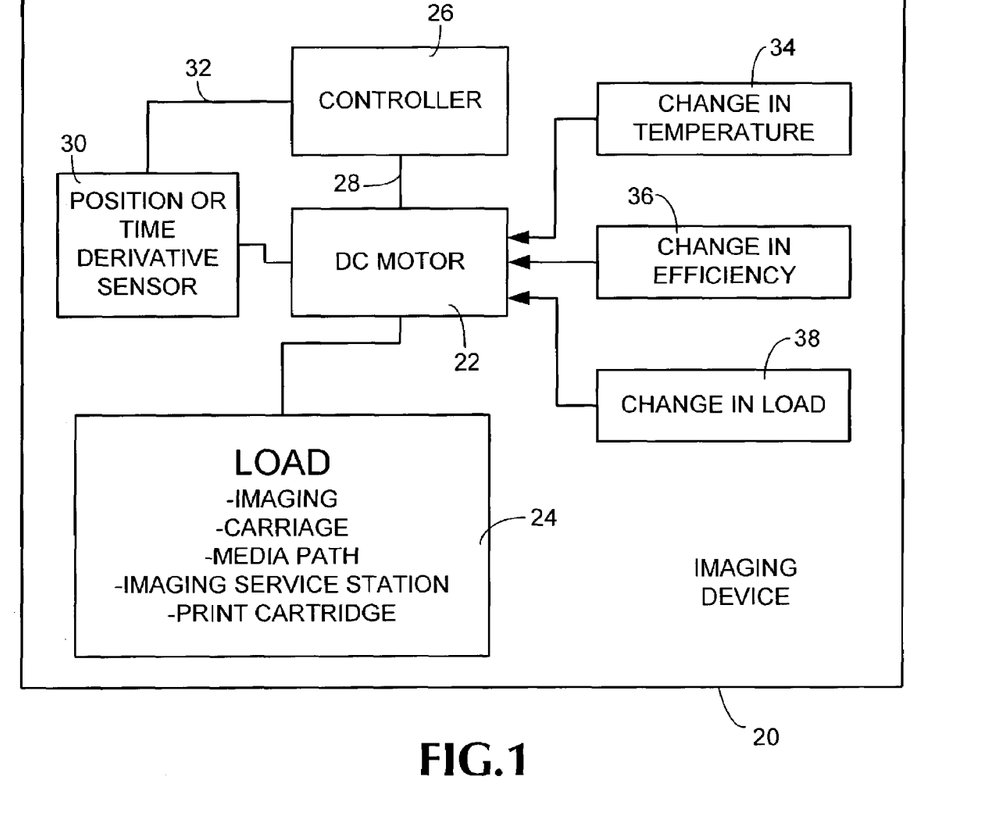
FIG. 1 schematically illustrates one embodiment of an imaging device with a DC motor.

FIG. 1 schematically illustrates one embodiment of an imaging device 20 having at least one DC motor 22. A variety of imaging devices are commercially available. For instance, some of the imaging devices that may embody the concepts described herein include desk top printers, portable printing units, wide-format printers, hybrid electrophotographic-inkjet printers, copiers, cameras, video printers, and facsimile machines, to name a few. The concepts introduced herein need not be limited to the environment of an imaging device, and can be applied to other devices having DC motors. However, for convenience the concepts introduced herein are described in the environment of an imaging device 20.

The DC motor 22 is coupled to a load 24. Since the embodiment of FIG. 1 is an imaging device 20, the load 24 could be an imaging load, such as a photoreceptor belt, a toner sump, or a fuser roller, for example. The load 24 could also be a carriage designed to hold ink cartridges for movement back and forth across a printzone while imaging. The load 24 could be a paper-path which transports an imaging media throughout the imaging device 20. The load 24 could also be some type of imaging service station, such as a capping and wiping system in an inkjet device, or an electrostatic brush cleaner in an electrophotographic system. The load 24 can be anything driven, moved, or activated by the torque produced from the DC motor 22. The coupling of the load 24 to the motor 22 may be accomplished directly, or by way of linking elements such as gears, pulleys, clutches, belts, friction rollers, or any combination thereof. Such linking elements are well known to those skilled in the art.

The motor 22 may be coupled to a controller 26. The controller 26 may be a computer, a microprocessor, an application specific integrated circuit (ASIC), digital components, analog components, or any combination thereof. The controller 26 provides an input 28 to the DC motor 22. A DC motor can have at least two possible inputs. In one instance, the magnetic flux may be varied, and in another instance, the current in the windings, or armature current may be varied. Thus, there are two common modes of operation for a DC motor: 1) armature control, where an adjustable voltage or current is applied to the armature or windings while the magnetic flux is held constant. In this case, the magnetic flux may be held constant by maintaining a constant magnetic field current or by using a fixed magnet. 2) Field control, where an adjustable voltage or current is applied to create a magnetic field which may be varied, while the armature current is held constant.

Regardless of what mode of DC motor operation is selected, a technique referred to as pulse width modulation (PWM) may be employed to vary the effective voltage or current seen by the armature or by the field. PWM controls the motor 22 with short pulses of voltage or current. These pulses are varied in duration to change the speed of the motor. The longer the pulses, the more torque the motor can produce and visa versa. For example, if the output of a DC voltage source is twelve volts, and the PWM signal is on 25%, 50%, or 75% of the time, the motor would receive the approximate average of three, six, and nine volts, respectively.

PWM is a way of digitally encoding analog signal levels. Through the use of high-resolution counters, the duty-cycle of a square wave is modulated to encode a specific analog signal level. The PWM signal is still digital, however, because at any given instant in time, the DC supply is either fully on or fully off. Most motors require high PWM frequencies. The PWM period should be short relative to the motor's response time to a change in the switched signal state. Common PWM frequencies may range from 1 kHz to 200 kHz, for example. The duty cycle is the ratio of the on-time in a given period to the period duration.

For the sake of explanation, the following discussions will refer to the motor 22 in FIG. 1 as being controlled in armature control mode, with a fixed magnetic flux, using PWM from the controller 26 as the input 28 to the motor 22's windings. It should be understood that PWM could be applied to the magnetic field current instead. It should also be understood that other motor inputs, such as directly applied voltages or currents, not requiring the use of PWM may be applied. PWM is described in the embodiments for the sake of explanation.

A position or time derivative sensor 30, such as an encoder, may be coupled between the motor 22 and the controller 26. The position or time derivative sensor 30 provides positional, velocity, or acceleration feedback 32 to the controller 26. Based on the feedback 32, the controller 26 may adjust the input 28 to the motor 22, in this case adjust the PWM to the motor 22, in order to result in a desired positional move, motor speed, or motor acceleration.

Various factors may affect the DC motor's 22 ability to respond to the motor input 28 in order to move the load 24. An increase in temperature 34, which is seen in the motor windings, can cause the resistance to increase, since copper has a positive temperature coefficient with respect to resistance. Also, magnets have a negative temperature coefficient with respect to flux, so the magnetic field will become weaker as the temperature increases. As a result, the change in temperature 34 can affect the motor's efficiency. Any change in the motor's efficiency 36 can change the DC motor's 22 response to the controller's input 28 with regard to the motor's ability to move or actuate the load 24. The load 24 may also change 38. For example, if the load 24 is a carriage which holds print cartridges, as the print cartridges are emptied through printing, the load 24 will have less mass, and therefore will reduce the load. On the other hand, the load 24 may increase, due to increased friction from aging or dirty parts. There are any of a number of reasons why there could be a change in load 38, but a change in load 38 may also affect the ability of the DC motor 22 to respond to the motor input 28 in order to move the load.

As used herein, the term "print cartridge" may refer to an ink cartridge containing a pigment or a dye-based ink. It is apparent that other types of inks may also be used in a print cartridges, such as paraffin-based inks, as well as hybrid or composite inks having both dye and pigment characteristics. Print cartridges may be replaceable printhead cartridges where each cartridge has a reservoir that carries the entire ink supply as the print cartridge is moved within a device. A print cartridge may also refer to an "off-axis" ink delivery system, having main stationary reservoirs for each ink (black, cyan, magenta, yellow, or other colors depending on the number of inks in the system) located in an ink supply region. In an off-axis system, the print cartridges may be replenished by ink conveyed through a flexible tubing system from the stationary main reservoirs which are located "off-axis" from the path of print cartridge travel, so only a small ink supply is propelled within the device. Print cartridges may also include other ink delivery or fluid delivery systems, such as cartridges which have ink reservoirs that snap onto permanent or semi-permanent print heads.

Figure 2:
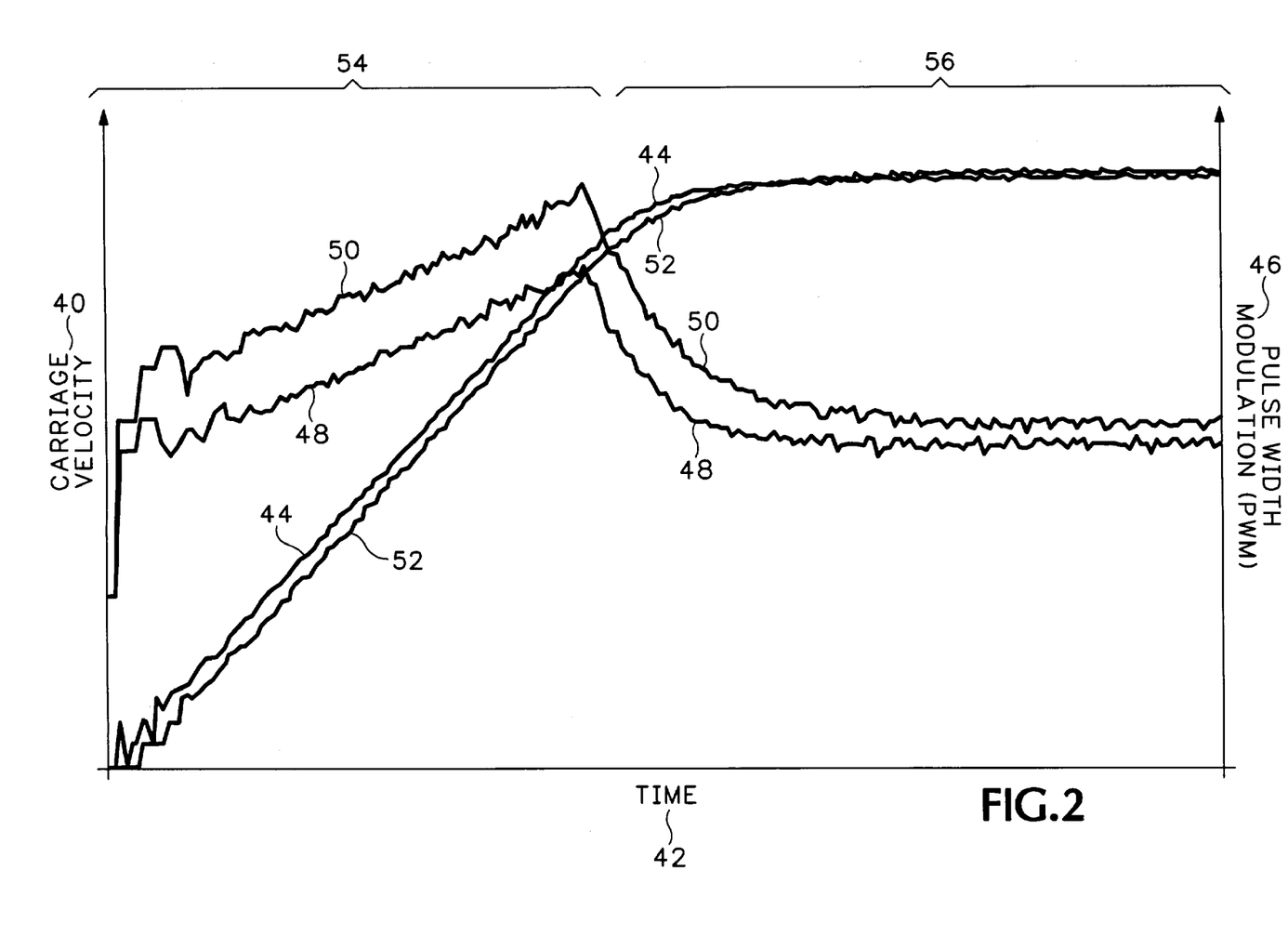
FIG. 2 illustrates one embodiment of pulse-width-modulation (PWM) curves and corresponding load velocity curves over time.

FIG. 2 illustrates one embodiment of pulse-width-modulation (PWM) curves and corresponding load velocity curves over time. The embodiment of FIG. 2 is for a carriage being moved by a DC motor 22. The carriage is for the transport of one or more print cartridges. The carriage velocity 40 is shown on the left vertical axis. Time 42 is depicted along the horizontal axis. The carriage velocity 40 is measured by the controller 26 through the use of feedback 32 taken from a position or time derivative sensor 30. Cold velocity curve 44 illustrates a velocity achieved versus time when the motor 22 is relatively cold. Based on the feedback 32 from the position or time derivative sensor 30, the controller 26 adjusts the motor input 28, in this case adjusts the PWM, to achieve the desired carriage velocity 40 at a given moment in time 42. The PWM 46 is shown on the right vertical axis. Cold PWM curve 48 illustrates the PWM 46 values over time 42 used to result in the cold velocity curve 44 in this embodiment. At some point, the load could change 38, for example, the load 24 may have more frictional resistance due to age or use. The motor efficiency could change 38, for example, the bearings inside the motor could become aged or dirty. The temperature in the motor can also change 34, simply through extended use of the motor. When the temperature of the windings increases, the resistance of the windings also increases. Thus, a change in load, efficiency, or temperature may require a larger or smaller input from the controller to maintain the same velocity. Warm PWM curve 50 illustrates the PWM 46 values over time 42 used to result in a warm velocity curve 52 in this embodiment. The start of the cold PWM curve 48 and the start of the warm PWM curve 50 are aligned in time 42 so that the two curves can be compared. Similarly, the start of the cold velocity curve 44 and the start of the warm velocity curve 52 are aligned in time 42 so that those two curves can be compared. As can be seen for this embodiment, in order to achieve a similar velocity under warmer conditions, the warmer PWM 50 must be significantly higher than the colder PWM 48. In this embodiment, the difference between the warm PWM curve 50 and the cold PWM curve 48 is greatest during an acceleration phase 54 of the velocity curves 44, 52. A substantially constant velocity phase 56 can also be seen on both the warm PWM curve 50 and the cold PWM curve 48. In this embodiment, the difference between the warm PWM curve 50 and the cold PWM curve 48, during the substantially constant velocity phase 56 is relatively small. This is indicative that the embodied system is an inertia dominated system. On the other hand, there are also systems which can be velocity or friction dominated. In these systems, the difference between the warm PWM curve 50 and the cold PWM curve 48 might be larger than illustrated for the embodiment of FIG. 2 during the substantially constant velocity phase 56.

The position or time derivative sensor 30 allows the controller to adjust the DC motor input 28, in this case, the PWM, so that a desired move, velocity, or acceleration is obtained by the load 24 coupled to the motor. Depending on the load 24 itself, or changes in temperature 34, changes in motor efficiency 36, and/or changes in load 38, the controller 26 may be in a position where it has to increase the DC motor input 28. This increased input 28, which compensates for changes in load, temperature, or efficiency, can cause the temperature of the motor windings to increase to the point where the insulation on the motor windings melts, and one or more of the windings short circuit. As a result of such a short circuit, the motor 22 can lose power, stop, or stall. To avoid this situation, a large motor is often selected to take into account the worst case loads, temperatures, and changes in efficiency that the motor could be expected to see. Along with the margin against motor failure that a larger motor provides, it is often more expensive and the additional size is often undesirable when compared to a smaller motor.

Figure 3:
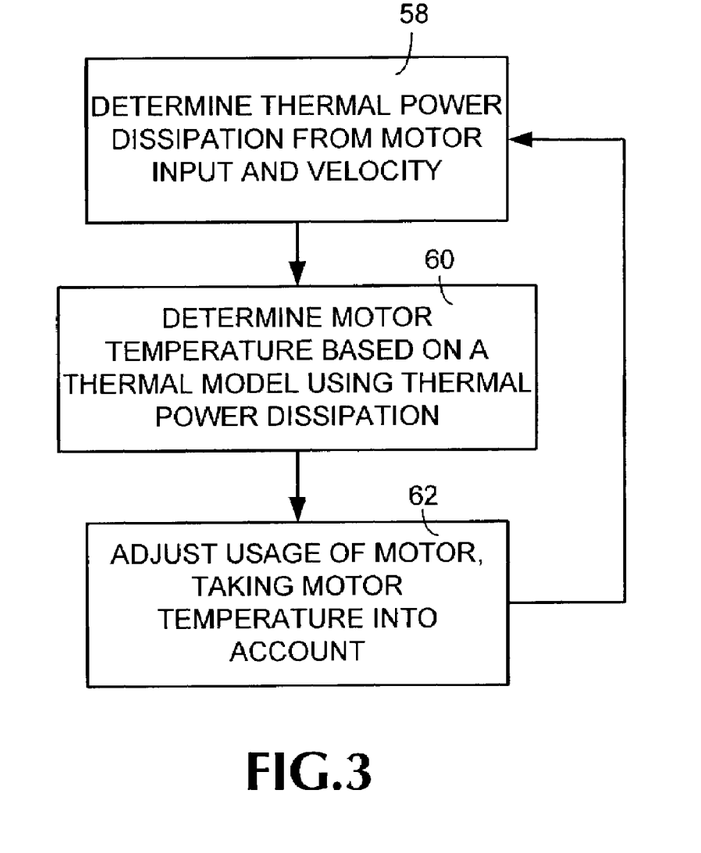
FIG. 3 illustrates an embodiment of actions which may adjust usage of a DC motor based on a motor input and a motor velocity.

FIG. 3 illustrates one embodiment of actions which may adjust the usage of a DC motor based on a motor input and a motor velocity. A thermal power dissipation is determined 58 from the motor input and the velocity of the motor. The motor input may be a pulse-width modulation (PWM) value, an applied voltage, or an applied current, for example. The motor velocity can be determined from the position or time derivative sensor 30 which is coupled to the DC motor 22. A motor temperature may then be determined 60 based on a thermal model using the thermal power dissipation. Finally, a usage of the DC motor may be adjusted 62, taking the motor temperature into account. Since the actions of this embodiment determine a motor temperature from the thermal power dissipation in the motor, as determined by the motor velocity and the motor input, absolutely nothing need be known about the load. Therefore, no calibration may be necessary, and there may be no increase in error in the temperature determination due to load changes.

The thermal power dissipation, $P_w$, in a DC motor 22, can be expressed by the following formula:

$$P_w = i^2 \cdot R_w \quad (A)$$

Wherein, i is the motor winding current, and $R_w$ is the motor winding resistance.

The motor winding current, i, is driven by the voltage applied to the DC motor, $V_a$, and countered by the voltage generated in the winding coils, $V_G$, moving in the magnetic field of the DC motor. This voltage generated by the motor, $V_G$, is also known as back-EMF. The system resistance is the sum of the motor winding resistance, $R_w$, and the resistance of the motor electronic drive circuitry, $R_D$. In one embodiment, the DC motor brush resistance is assumed to be negligible, and the electronic drive circuitry resistance, $R_D$, as well as the motor winding resistance, $R_w$, are assumed to be temperature invariant. Based on those assumptions, the motor winding current, i, may be expressed as:

$$i = \frac{V_a - V_G}{R_D + R_w} \quad (B)$$

Based on the above formulas (A) and (B), the thermal power dissipation, $P_w$, may be expressed as:

$$P_w = \frac{V_a^2 - 2 \cdot V_a \cdot V_G + V_G^2}{R_w^2 + 2 \cdot R_w \cdot R_D + R_D^2} \cdot R_w \quad (C)$$

An intermediate constant, $K_1$, may be defined as:

$$K_1 = \frac{R_w}{R_w^2 + 2 \cdot R_w \cdot R_D + R_D^2} \quad (D)$$

thereby allowing the thermal power dissipation, $P_w$, to be expressed as:

$$P_w = K_1 \cdot (V_a^2 - 2 \cdot V_a \cdot V_G + V_G^2) \quad (E)$$

The voltage generated by the motor, $V_G$, can be expressed as:

$$V_G = K_e \cdot \omega \quad (F)$$

where, $K_e$ is a motor back-EMF constant, and $\omega$ is the rotational speed of the motor.

For DC motors which have a motor input in the form of a PWM value, the voltage applied to the motor, $V_a$, can be specified as:

$$V_a = V_S \cdot \frac{PWM}{PWM_{max}} \quad (G)$$

where, $V_S$ is a full-range voltage available to the DC motor, PWM is the pulse-width modulation input value, and $PWM_{max}$ is the maximum possible pulse-width modulation value.

Therefore, knowledge of the motor velocity $\omega$ and the associated motor input $V_a$ may be used to determine the thermal power dissipation, $P_w$.

The preceding embodiments assumed that the motor winding resistance $R_w$ is temperature invariant. However, motor windings made of various materials are known to have a temperature sensitivity. For example, copper has a temperature sensitivity of 0.39% per degree Celsius. Therefore, the formulae which make use of the motor winding resistance, $R_w$, such as equation (D), may alternately be adjusted to compensate for a change in resistivity at various temperatures.

Figure 4:
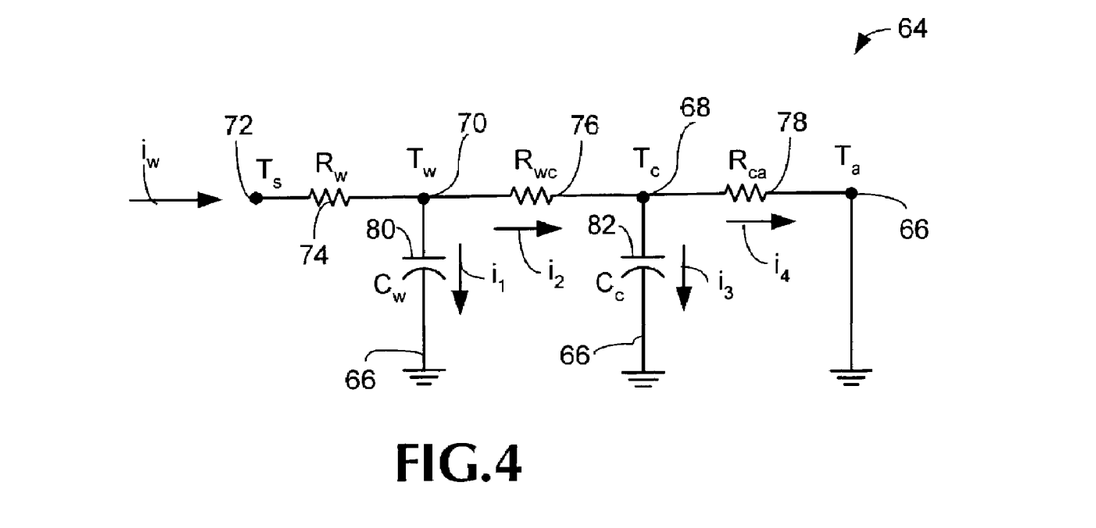
FIG. 4 schematically illustrates an embodiment of a thermal model of a DC motor which can be used in a motor control system.

FIG. 4 schematically illustrates an embodiment of a thermal model 64 of a DC motor which can be used in a motor control system. The thermal model 64 has several temperature nodes which can be thought-of in similar fashion to voltages. An ambient temperature, $T_a$, node 66 is a common node by which other temperatures may be taken with reference-to. These temperatures, which may be measured with respect to the ambient temperature, $T_a$, are the motor case temperature 68, $T_c$, the motor winding temperature 70, $T_w$, and the motor system temperature 72, $T_s$. A winding thermal resistance 74, $R_w$, is coupled between the system temperature 72, $T_s$, and the winding temperature 70, $T_w$. A winding-to-casing thermal resistance 76, $R_{wc}$, is coupled between the winding temperature 70, $T_w$, and the motor case temperature 68, $T_c$. There is also a case-to-ambient thermal resistance 78, $R_{ca}$, which is coupled between the motor case temperature 68, $T_c$, and the ambient temperature 66, $T_a$. Since the motor elements do not heat up or cool-off instantaneously, some thermal capacitance elements are included in the thermal model 64. A winding thermal capacitance 80, $C_w$, is coupled between the winding temperature 70, $T_w$, and the ambient temperature 66, $T_a$. A motor case thermal capacitance 82, $C_c$, is coupled between the motor case temperature 68, $T_c$, and the ambient temperature 66, $T_a$.

The thermal model 64 has several thermal power dissipations, namely, a winding thermal power dissipation, $i_w$, and branch thermal power dissipations $i_1$, $i_2$, $i_3$, and $i_4$. The relationship between these thermal power dissipations is as follows:

$$i_w = i_1 + i_2 \quad (H)$$

and, $$i_2 = i_3 + i_4 \quad (I)$$

The thermal capacitances 80, 82, may be expressed as follows:

$$C_w = \frac{i_1}{\dot{T}_w} \quad (J)$$

and, $$C_c = \frac{i_3}{\dot{T}_c} \quad (K)$$

where $\dot{T}_w$ is the time derivative of the winding temperature, and $\dot{T}_c$ is the time derivative of the motor casing temperature.

The thermal resistances 74, 76, 78 may be expressed as follows:

$$R_{wc} = \frac{T_w - T_c}{i_2} \quad (L)$$

and, $$R_{ca} = \frac{T_c - T_a}{i_4} \quad (M)$$

and, $$R_w = \frac{T_i - T_w}{i_w} \quad (N)$$

Noting that $i_w = P_w$, and combining formulas (H), (J), and (L) above, the change in winding temperature, otherwise known as the time derivative of the winding temperature, $\dot{T}_w$, can be expressed as:

$$\dot{T}_w = \frac{-1}{C_w R_{wc}} \cdot T_w + \frac{1}{C_w R_{wc}} \cdot T_c + \frac{1}{C_w} \cdot P_w \quad (O)$$

Defining constants $K_2$, $K_3$, and $K_4$ as follows:

$$K_2 = \frac{-1}{C_w R_{wc}} \quad (P)$$

and, $$K_3 = \frac{1}{C_w R_{wc}} \quad (Q)$$

and, $$K_4 = \frac{1}{C_w} \quad (R)$$

the equation for the change in winding temperature, $\dot{T}_w$, may be written as:

$$\dot{T}_w = K_2 \cdot T_w + K_3 \cdot T_c + K_4 \cdot P_w \quad (S)$$

The constants $K_2$, $K_3$, and $K_4$ may be determined empirically by taking winding and case temperatures $T_w$, $T_c$, with measurement devices, such as thermocouples or thermal imaging equipment, by tracking the thermal power dissipation $P_w$, by tracking the change in winding temperature $\dot{T}_w$, and by using numerical tools and techniques to fit the empirical data to the equation format illustrated in the embodiment above, equation (S).

Combining (I), (K), (L), and (M) above, the change in motor case temperature, otherwise known as the time derivative of the motor case temperature, $\dot{T}_c$ can be expressed as:

$$\dot{T}_c = \frac{-1}{C_c R_{wc}} \cdot T_c + \frac{-1}{C_c R_{ca}} \cdot T_c + \frac{1}{C_c R_{wc}} \cdot T_w + \frac{1}{C_c R_{ca}} \cdot T_a \quad (T)$$

Defining constants $K_5$, $K_6$, $K_7$, and $K_8$ as follows:

$$K_5 = \frac{-1}{C_c R_{wc}} \text{ and,} \quad (U)$$

$$K_6 = \frac{-1}{C_c R_{ca}} \text{ and,} \quad (V)$$

$$K_7 = \frac{1}{C_c R_{wc}} \text{ and,} \quad (W)$$

$$K_8 = \frac{1}{C_c R_{ca}} \quad (X)$$

the equation for the change in motor case temperature, $\dot{T}_e$ may be written as:

$$\dot{T}_c = K_5 \cdot T_c + K_6 \cdot T_c + K_7 \cdot T_w + K_8 \cdot T_a \quad (Y)$$

The constants $K_5$, $K_6$, $K_7$, and $K_8$ may be determined empirically by taking winding, case, and ambient temperatures $T_w$, $T_c$, and $T_a$ with measurement devices, such as thermocouples or thermal imaging equipment, by tracking the change in motor case temperature $\dot{T}_c$, and by using numerical tools and techniques to fit the empirical data to the equation format illustrated in the embodiment above, equation (Y).

Once the constants $K_2$ through $K_8$ for a given type of motor are known, the following two equations may be used in conjunction with each other to determine the change in motor winding temperature, $\dot{T}_w$, and the change in motor case temperature, $\dot{T}_c$:

$$\dot{T}_w = K_2 \cdot T_w + K_3 \cdot T_c + K_4 \cdot P_w \quad (S)$$

$$\dot{T}_c = K_5 \cdot T_e + K_6 \cdot T_c + K_7 \cdot T_w + K_8 \cdot T_8 \quad (Y)$$

If calculating the change in motor winding temperature, $\dot{T}_w$, and the change in motor case temperature, $\dot{T}_c$, from a time when the motor can be assumed to have cooled-off to ambient temperature, the starting motor winding temperature $T_w$, and the starting motor case temperature $T_c$, can be assumed to be equal to the ambient temperature $T_a$. Depending on the availability of an ambient temperature reference, the ambient temperature, $T_a$, may be assumed to be a statistically common room temperature in some embodiments. In other embodiments, there may be a dedicated ambient temperature sensor available. In still other embodiments, such as in an imaging device, there may be a component, such as an inkjet print cartridge which has a thermal sense resistor which may be used to determine the ambient temperature after the print cartridge has cooled for a sufficient amount of time.

The constants $K_2$ through $K_8$ are known. Starting from a known ambient temperature $T_a$, we can say that $T_c = T_w = T_a$. The thermal power dissipation $P_w$ may be calculated from the motor input and the motor velocity as discussed with regard to equations (E), (F), and (G) above. Knowing $T_a$, $T_c$, $T_w$, $P_w$, and $K_2$ through $K_8$, the change in motor winding temperature, $\dot{T}_w$, and the change in motor case temperature, $\dot{T}_e$ may be determined per equations (S) and (Y) above. The updated motor case temperature will be the old motor case temperature plus the change in motor case temperature. Similarly, the updated motor winding temperature will be the old motor winding temperature plus the change in motor winding temperature. These updated temperatures may be used in subsequent temperature change calculations (S) and (Y).

While a servo control system for a DC motor may have a relatively high frequency for control updates (for example, 1200 Hz), the comparably slow nature of thermal dynamics makes it possible not to require a recalculation of present motor winding temperature and motor case temperature at every servo control update point. The thermal time constants for the system described herein are the eigenvalues of the following expression:

$$\begin{bmatrix} \dot{T}_w \\ \dot{T}_c \end{bmatrix} = \begin{bmatrix} K_2 & K_3 \\ K_7 & K_5 + K_6 \end{bmatrix} \begin{bmatrix} T_w \\ T_c \end{bmatrix} \quad (YA)$$

By taking the minimum time constant, and ensuring that temperature updates are determined approximately at least 10 times during that minimum time constant, a stable numerical determination may be made. Embodiments which do not determine the change in temperature at every servo control update point should still store the motor input value, $V_a$, and the motor velocity ω at multiple servo control update points for the later time when the temperature determination is made. When a temperature determination is desired, the instantaneous thermal power dissipation given above in equation (E) may be modified as follows to determine an average thermal power dissipation, $\overline{P}_w$, based on a series of n stored motor input values, $V_a$, and the corresponding stored motor velocities, ω:

$$\overline{P}_w = \frac{K_1}{n} \cdot [\Sigma(V_a^2) - 2 \cdot \Sigma(V_a \cdot V_G) + \Sigma(V_G^2)] \quad (Z)$$

The applied voltage, $V_a$, and the voltage generated by the motor, $V_G$, have been discussed previously with regard to equations (F) and (G). The average thermal power dissipation, $\overline{P}_w$, may be used in lieu of the instantaneous thermal power dissipation $P_w$, in order to save computation bandwidth. In order to reduce error when using the average thermal power dissipation, it may be advisable to determine the average thermal power dissipation approximately ten times per thermal time constant or more frequently.

Figure 5:
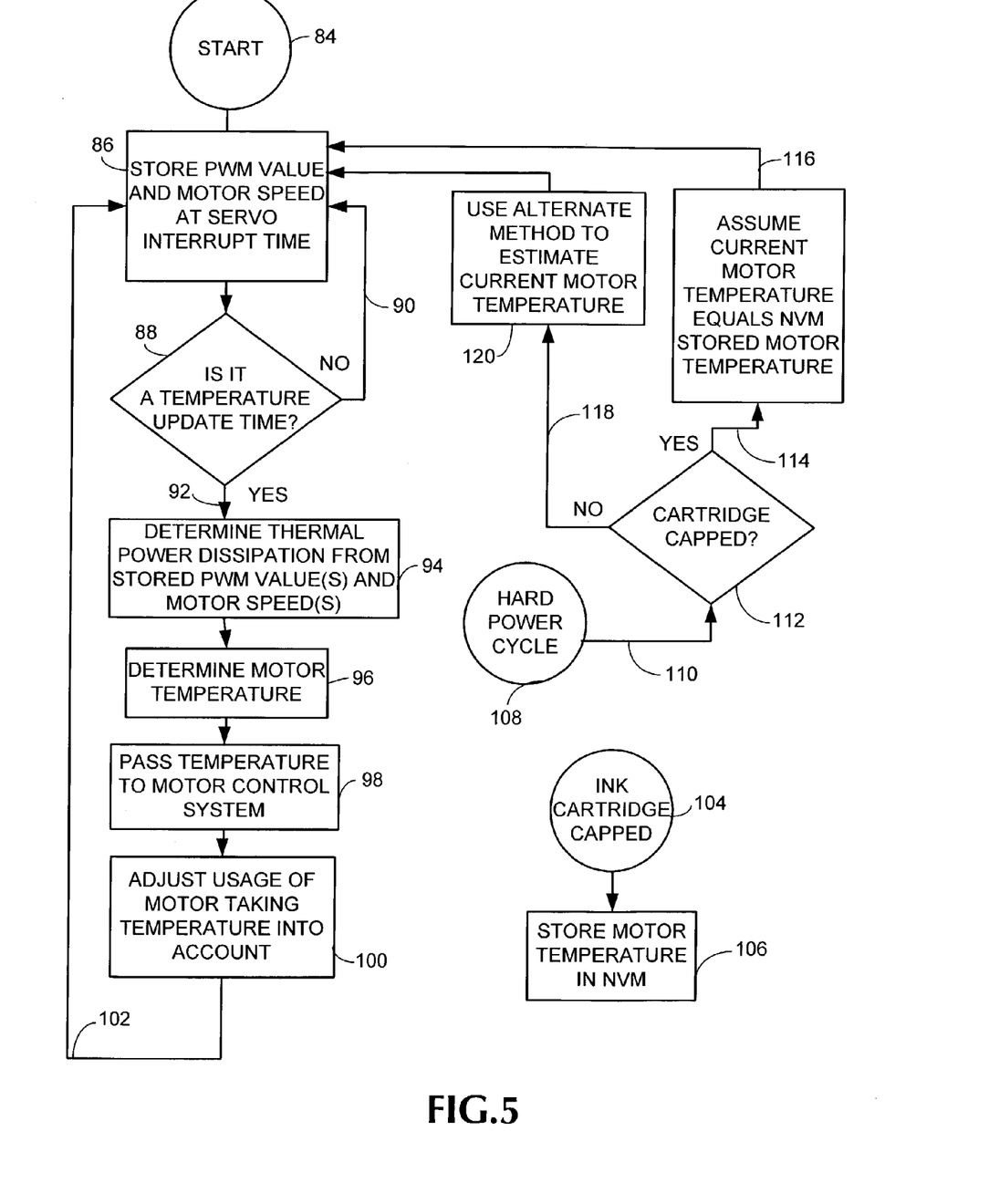
FIG. 5 illustrates an embodiment of actions which may adjust usage of a DC motor based on a motor input and a motor velocity.

FIG. 5 illustrates an embodiment of actions which may adjust usage of a DC motor based on a motor input and a motor velocity in an imaging device having a print cartridge. The print cartridge may be capped when it is not in use to prevent drying of the nozzles in the print cartridge. The illustrated embodiment of FIG. 5, has a starting point 84 where the print cartridge of the imaging device is uncapped, and a DC motor coupled to the print cartridge is being used to move the print cartridge. A motor input value, here illustrated as a PWM value, and a motor speed are stored 86 at a servo interrupt time. A determination is made 88 whether or not it is a temperature update time. Temperature updates may be made at every servo update time, or at a multiple of the servo update time, depending on the availability of system resources and the thermal time constants of the system, as previously discussed. If it is not 90 a temperature update time, then another PWM value and a motor speed are stored 86 at the servo interrupt time. If it is a temperature update time 92, a thermal power dissipation is determined 94 from the stored PWM value(s) and motor speed(s). This thermal power dissipation may be an instantaneous thermal power dissipation as discussed with regard to equation (E) above, or an average thermal power dissipation as discussed with regard to equation (Z) above. In order to determine an average power dissipation, the PWM values and motor speeds stored since the last temperature determination are used.

Once a thermal power dissipation has been determined 94, a motor temperature may be determined 96. In addition to the thermal power dissipation, determining 96 the motor temperature requires tracking of the ambient temperature, the motor case temperature, and the motor winding temperature, as described with regard to equations (S) and (Y) above. Next, the motor temperature may be passed 98 to the motor control system. The passed motor temperature may be either the motor winding temperature, the motor case temperature, or both. The usage of the motor may be adjusted 100, taking the motor temperature into account. In order to avoid melting the insulation on the motor windings which may cause the motor to fail, or simply in order to avoid outgassing of the winding insulation, the motor input may be reduced, and/or delays between motor moves may be added or increased to reduce the average power dissipation in the motor. Likewise, if the motor has cooled or is running cool, the usage of the motor may be increased if the rest of the system coupled to the motor can handle the higher speeds and it is desirable to operate the motor at a higher level. Finally, the imaging device can return 102 to storing 86 PWM values (motor input) and motor speeds so that thermal power dissipation may be determined 94, motor temperature determined 96, and motor usage adjustments made 100 as previously discussed.

In the event that the print cartridge is capped 104, then the last determined motor temperature may be stored 106 in non-volatile memory (NVM). Recall that the motor temperature involves both the motor winding temperature and the motor case temperature. By storing the motor temperature in NVM, the imaging device will have recourse to a worst-case high temperature in the event that there is a hard power cycle. A hard power cycle is an event where the imaging device loses power unexpectedly, for example due to a power failure or an unplugging of the device, and then is turned back on when power is restored. Hard power cycle scenarios are discussed in more detail below. Alternately, in order to save NVM space, either the motor winding temperature or the motor case temperature could be stored in NVM, rather than both. If it becomes necessary to read the motor temperature stored in NVM, and if only one temperature ($T_w$ or $T_c$) is stored, then the system may assume that the motor case temperature equals the motor winding temperature as a starting point. In other embodiments, it may be desirable to store motor temperatures in NVM at different intervals from the printhead capping event 104. In any event, NVM may have a limited number of times it can be written-to, which must be taken into account, and volatile memory is adequate for tracking motor temperature during normal operation.

In the event that there is a hard power cycle 108 at any point in time, upon powering back up 110, a determination can be made 112 of whether or not the print cartridge is capped. If the print cartridge is capped 114, the imaging device may safely assume 116 the present motor temperature equals the NVM stored motor temperature. Since the print cartridge is capped, and therefore the DC motor is not in use, the stored NVM temperature may then be used in the motor temperature determination 96 as discussed above. If the motor is activated before the temperature decays to ambient temperature, the stored temperature may be larger than the actual temperature if the motor has had time to cool off during the hard power cycle. The system will again be accurate, however, once the motor has been determined to have cooled to ambient temperature.

If the print cartridge is determined to be uncapped 118 after a hard power cycle 108, then the current motor temperature may be higher than the temperature stored in NVM. In this case, an alternate method 120 may be used to estimate the current motor temperature. For example, the current motor temperature could be assumed to be the maximum motor temperature at which there would not be a motor winding failure. Using this as the current temperature, the motor may run slower that necessary until the motor is determined to have reached ambient temperature. This, however, may be an acceptable trade-off for safety. Alternately, the motor control system may estimate 120 the current temperature using a method that examines the motor PWM during the acceleration phase of a motor move, such as that in related U.S. patent application Ser. No. 10/175,711, the specification of which is hereby expressly incorporated by reference. While the methods of U.S. patent application Ser. No. 10/175,711 may not be used during all phases of motor use, they can provide an estimate of motor temperature in order to recover from a hard power cycle 108.

Although FIG. 5 illustrates one embodiment where the temperature determination actions described herein, and their equivalents, may be applied, it should be apparent that the any device having a DC motor may determine motor temperature provided the motor input and the motor speed are available. The actions described herein, and their equivalents provide for an accurate way to estimate motor temperature, without the need for a dedicated motor temperature sensor. This accuracy is due, in part, to the low variability of the thermal parameters of motors. The embodiments illustrated and described herein do not need to know anything about the load coupled to the motor. Therefore, the determination of the thermal power dissipation and the motor temperature are load invariant. Thus, no calibration is needed for each device employing these actions. Furthermore, based on the load invariance, embodiments of DC motor control may be leveraged from one system into another, given a similar DC motor, similar motor driver resistance, and similar motor thermocoupling to a chassis, despite the fact that different loads may be coupled to the DC motor in each system.

In discussing the included embodiments, various benefits have been noted above. It is apparent that a variety of other functionally equivalent modifications and substitutions may be made to implement an embodiment of DC motor control according to the concepts covered herein, depending upon the particular implementation, while still falling within the scope of the claims below.

We claim:

1. A method of controlling a DC motor, comprising:
   determining a thermal power dissipation from a motor input and a motor velocity, wherein the motor input comprises an applied voltage;
   determining a motor temperature based on a thermal model using the thermal power dissipation; and
   adjusting a usage of the motor, taking the motor temperature into account, wherein determining the thermal power dissipation from the motor input and the motor velocity comprises:
   determining the applied voltage to the DC motor based on the motor input;
   determining a voltage generated by the DC motor based on a motor back-EMF constant and the motor velocity; and
   determining the thermal power dissipation based on the applied voltage, the voltage generated by the DC motor, a known motor winding resistance, and a known motor driver circuit resistance.

2. The method of claim 1, wherein the thermal power dissipation comprises an instantaneous thermal power dissipation.

3. The method of claim 2, wherein the motor input comprises a pulse-width modulation (PWM) value.

4. The method of claim 1, wherein the thermal power dissipation comprises an average thermal power dissipation.

5. The method of claim 4, wherein the motor input comprises a series of applied voltages.

6. The method of claim 4, wherein the motor input comprises a series of PWM values.

7. The method of claim 1, wherein the known motor winding resistance is adjusted to compensate for temperature sensitivity.

8. An imaging device, comprising:
   at least one print cartridge;
   a DC motor coupled to the at least one print cartridge; and
   a controller, coupled to the DC motor, configured to control the DC motor using the method of claim 1.

9. A method of controlling a DC motor, comprising:
   determining a thermal power dissipation from a motor input and a motor velocity;
   determining a motor temperature based on a thermal model using the thermal power dissipation; and
   adjusting a usage of the motor, taking the motor temperature into account;
   wherein determining the motor temperature based on the thermal model using the thermal power dissipation comprises:
   determining a change in a motor winding temperature based on a stored motor winding temperature, a stored motor case temperature, and the thermal power dissipation; and
   determining a change in a motor case temperature based on the stored motor case temperature, the stored motor winding temperature, and an ambient temperature.

10. The method of claim 9, wherein the ambient temperature is an assumed ambient temperature.

11. The method of claim 9, wherein the ambient temperature is determined by a thermal sense resistor on a print cartridge.

12. A method of controlling a DC motor in an imaging device having a print cartridge coupled to the DC motor, comprising:
   while the print cartridge is in an uncapped state:
   storing at least one motor input value and at least one motor speed;
   determining a thermal power dissipation from the at least one stored motor input value and the at least one motor speed;
   determining a motor temperature based on the thermal power dissipation, wherein determining the motor temperature based on thermal power dissipation comprises:
   determining a change in a motor winding temperature based on a stored motor winding temperature, a stored motor case temperature, and the thermal power dissipation; and
   determining a change in a motor case temperature based on the stored motor case temperature, the stored motor winding temperature, and an ambient temperature; and
   adjusting a usage of the DC motor, taking the motor temperature into account.

13. The method of claim 12, further comprising:
   while the print cartridge is in a capped state:
   storing the motor temperature.

14. The method of claim 13, wherein the at least one motor input comprises a PWM value.

15. The method of claim 13, wherein the thermal power dissipation comprises an instantaneous thermal power dissipation.

16. The method of claim 13, wherein the thermal power dissipation comprises an average thermal power dissipation.

17. The method of claim 13, wherein determining a motor temperature based on the thermal power dissipation further comprises determining the motor temperature based on a thermal model using the thermal power dissipation.

18. A method, comprising:
   determining a speed of a DC motor;
   determining an input to the DC motor, wherein the input comprises a series of applied voltages and a known motor winding resistance that has been adjusted based on a previously determined temperature of the DC motor;
   calculating a thermal power dissipation using the determined speed and the determined input;
   calculating a temperature of the DC motor using the calculated thermal power dissipation;
   adjusting usage of the DC motor based on the calculated temperature.

* * * * *

UNITED STATES PATENT AND TRADEMARK OFFICE
CERTIFICATE OF CORRECTION

PATENT NO. : 7,692,399 B2
APPLICATION NO. : 10/405774
DATED : April 6, 2010
INVENTOR(S) : Douglas L. Harriman et al.

It is certified that error appears in the above-identified patent and that said Letters Patent is hereby corrected as shown below:

In column 1, line 2, below "DC MOTOR CONTROL" insert -- INTRODUCTION --.

In column 12, lines 26-29, in Claim 12, delete
 "determining a motor temperature based on the thermal
  power
 dissipation, wherein determining the motor temperature
  based on thermal power dissipation comprises:" and insert
 -- determining a motor temperature based on the thermal
  power dissipation, wherein determining the motor
  temperature based on thermal power dissipation
  comprises: --, therefor.

Signed and Sealed this

Thirty-first Day of August, 2010

David J. Kappos
*Director of the United States Patent and Trademark Office*